(12) United States Patent
Seidl

(10) Patent No.: US 6,447,014 B1
(45) Date of Patent: Sep. 10, 2002

(54) MULTILAYER LABEL

(75) Inventor: Peter Seidl, Munich (DE)

(73) Assignee: Schreiner Etiketten und Selbstklebetechnik GmbH & Co., Oberschleissheim (DE)

(*) Notice: Subject to any disclaimer, the term of this patent is extended or adjusted under 35 U.S.C. 154(b) by 0 days.

(21) Appl. No.: 09/403,314

(22) PCT Filed: Feb. 19, 1999

(86) PCT No.: PCT/EP99/01103

§ 371 (c)(1),
(2), (4) Date: Mar. 16, 2000

(87) PCT Pub. No.: WO99/42980

PCT Pub. Date: Aug. 26, 1999

(30) Foreign Application Priority Data

Feb. 20, 1998 (DE) .......................... 198 07 232

(51) Int. Cl.[7] ................................. G09F 3/10
(52) U.S. Cl. ..................... 283/81; 283/17; 283/72; 283/73; 283/74; 283/94; 283/98; 283/100; 283/101; 283/109; 428/201; 428/203; 428/40.1; 428/915; 428/916
(58) Field of Search ..................... 283/72, 73, 74, 283/81, 17, 94, 98, 100, 101, 109; 428/201, 203, 40.1, 42.2, 915, 916

(56) References Cited

U.S. PATENT DOCUMENTS 4,184,701 A * 1/1980 Franklin et al. ............. 428/916
4,504,083 A * 3/1985 Devrient et al. ............. 283/74
4,766,026 A * 8/1988 Lass et al. ..................... 283/94
5,181,745 A * 1/1993 Jacobsen et al. ............. 283/94
5,484,996 A * 1/1996 Wood ........................... 283/81
5,830,529 A * 11/1998 Ross ........................... 428/914
5,895,075 A * 4/1999 Edwards ...................... 428/915
6,060,143 A * 5/2000 Tompkin et al. ............. 428/916

FOREIGN PATENT DOCUMENTS

| DE | 20 51 845 | 5/1971 |
| DE | 26 13 131 | 10/1977 |
| DE | 195 01 380 A1 | 8/1996 |
| EP | 0 755 776 A1 | 1/1997 |
| GB | WO 95 29475 | 11/1995 |

* cited by examiner

Primary Examiner—A. L. Wellington
Assistant Examiner—Mark T. Henderson
(74) Attorney, Agent, or Firm—Nixon Peabody LLP; Donald R. Studebaker

(57) ABSTRACT

The invention relates to a multilayer label comprising at least one authenticity feature (5), which authenticity feature (5) consists of at least two parts (51, 52) positioned on different layers (1, 2) of the label. The authenticity feature (5) can be a barcode which can consist of at least two parts (51, 52) positioned on different layers (1, 2) of the label. The barcode can have m lines of which n lines are arranged on one layer (1) of the label and m-n lines are arranged on another layer (2) of the label, where m>n>0. The label can have a lower layer (2) and an upper layer (1), with the lower layer (2) having a greater surface area than the at least one layer (1) positioned on top of it. The upper side and/or lower side of at least one of the layers (1, 2) can be coated with an adhesive at least in sections and/or at least in points.

4 Claims, 2 Drawing Sheets

MULTILAYER LABEL

This invention relates to a multilayer label.

The problem has long existed in multilayer labels that, during production of such multilayer labels, in principle it must be checked at all times if in fact all layers of this multilayer label are present. In this connection, experience shows that it suffices not only to monitor the presence of the individual layers of the multilayer label but under certain circumstances it can also be necessary to determine if each layer is in the right position on and in the multilayer label.

Since the individual layers of a multilayer label are often applied not with a small spatial and/or temporal distance between them, such monitoring is connected with an unavoidably high logistical and organizational outlay.

On the other hand, multilayer labels, precisely when they are used, for example, in pharmaceutical applications, involve technically exact, not uncomplicated products in which each individual layer usually has a special task and function. Not only an absence, but also a shifting or a twisting of a layer can lead to a malfunction and thus to unusability of the overall multilayer label.

Such a malfunction and consequent unusability not only produces serious consequences leading to the multilayer labels, produced for the most part with errors or defects in very large numbers, no longer being marketable because they are rejects which, for the producer, leads to undesirable labor and material losses and high costs, but also carries a certain danger to the extent that such an error or defect remains unnoticed by the producer and such incorrectly or defectively produced multilayer labels could fail in practical use, which can be not only unsatisfactory in any case but even risky under certain circumstances.

The disadvantages and inadequacies explained above were not able to be eliminated by the multilayer label known from the prior art.

Consequently, the object of this invention is providing a multilayer label in which it can be determined, in a technically simple and yet still reliable way, if all layers are present in the way they should be.

Further, the object of this invention is to make it possible for the checking of the proper arrangement of the individual layers in the multilayer label to be performed by machine, i.e., automatically.

Finally, the label is to be produced quickly and economically and, as appropriate, already-available production units will be used to the greatest extent possible.

According to the invention, these objects are achieved by a multilayer label that has at least one safety feature consisting of at least two parts placed on different layers of the label.

Since in the multilayer label according to this invention there is at least one safety feature consisting of at least two parts placed on different layers of the label, it can be determined in a technically surprisingly simple and yet reliable way if all layers of the label are present and even regardless of whether or not the label has two layers or more than two layers. For this purpose there is available, for example, a scanning and checking of the safety feature for completeness and also for proper arrangement or proper composition with a suitable optical procedure.

One skilled in the art will know, in this connection, to appreciate the fact that, with this multilayer label, also an intermixing or interchanging of various types of labels can be precluded with great reliability because in practice each type of label is provided with a different safety feature. In this way it can be prevented that a layer of the multilayer label is from a batch other than another layer of the multilayer label.

With respect to the features essential to the invention, features that are implemented in the form of a safety feature that can be assembled from at least two parts placed on different layers of the label, the checking of the proper arrangement of the individual layers can be performed in a mechanical, i.e., automatic way, whether already during the production process or in an especially preferred way in the context of the finishing final check.

According to an especially inventive further development of this multilayer label, the safety feature involves at least one bar code. Such bar codes generally comprise a series of variably thick lines spaced in varying ways relative to one another and make it possible in this way to store specific data which, in this case, can be relevant to the label itself and/or to the object to be labeled.

If the multilayer label is now equipped according to this invention with a bar code as a safety feature, then it is possible for the bar code to comprise at least two parts placed on different layers of the label.

Here it is suitable to provide some of the lines of the bar code, for example on the bottom layer of the label, and the rest of the lines on the top layer of the label. This technical measure makes it possible for the bar code to be detected in its entirety by a laser beam, for example, only when the different layers of the label are put together correctly, guaranteeing that both layers of the label are present.

Preferably there is also an embodiment in which the lines of the bar code are provided alternately on a bottom layer of the label and on an top layer of the label. This variant too makes it possible to check the arrangement of both layers of the label in an especially precise and reliable way.

If it is desired to take both above-described embodiments for implementing a bar code as a safety feature in an abstract way, an embodiment is preferred according to this invention in which the bar code has m lines of which n lines are placed on one layer of the label and m-n lines are placed on another layer of the label. Here the relation applies for whole, positive numbers m, n where m is larger than n.

With respect to the use of at least one bar code as a safety feature, it is also viewed as a feature essential to the invention of this multilayer label that, in producing labels, after the checks envisioned during the individual production steps, a last, finishing, final check of the finished label must be performed. This final check is generally performed with a code reader by which it is possible to determine not only if all labels are present but also if each label includes all provided layers.

One skilled in the art will appreciate the fact that, in addition to this, by providing at least one bar code as a safety feature, a checking of the label with respect to it belonging to the right batch can be integrated into the final check by the code reader; an especially aggravating and damaging mixing of different batches or individual layers from different batches can consequently be precluded in practice in a convincing way.

In practice, the use of at least one bar code as a safety feature makes it possible to incorporate the final check performed by a code reader in a synergistic way into the process of producing and checking the labels, saving expense and unnecessary costs associated with production.

The above-selected terminology, "multilayer label," implies that the multilayer-,label according to this invention has two or more than two layers. In this connection, it is highlighted as a feature essential to the invention that the at least one safety feature according to claim 1 of this invention can be distributed to more than two layers, if the multilayer label has not only a bottom layer and a top layer. In this sense, an assembling of the safety feature from three or more parts is conceivable, parts that are located on various layers of the label.

Regardless of the number of layers intended, it is suitable to consider an embodiment in which the lower layer has a larger surface area than the at least one layer placed above it. In this case, a part of the safety feature can be placed on the "projecting" area of the lower layer and be completed by the at least one other part of the safety feature that is provided on one or on several layers placed on top of the lower layer, so that the safety feature is assembled in its entirety from the individual parts. Decisive is that the lower layer not be completely covered by the top layer placed over it but that the part of the lower layer on which the safety feature is placed remain exposed.

The same effect is achieved if, according to an advantageous embodiment of this invention, at least one of the layers is transparent. This configuration is to be used in particular if the parts of the safety feature provided on the lower layers are assembled in coordination with the part of the safety feature provided on the top layer, and it is often suitable to make the top layer transparent.

Preferably at least one of the layers is provided with adhesive on its top side and/or on its bottom side, at least in sections and/or at least at certain points. This adhesive makes it possible, on the one hand, to produce a bond between the individual layers of the multilayer label, i.e., at least two layers of the label can be connected to one another by adhesive; on the other hand, the adhesive can also be used to apply the label to an object. It proves advantageous for this latter purpose if the lower layer is provided with adhesive on its underside, at least in sections and/or at least at certain points.

To make it possible mechanically to dispense the multilayer labels according to this invention, the adhesive that can be provided on the underside of the lower layer at least in sections and/or at least at certain points is suitably coated with an anti-adhesive carrier material. Here the label is located in a suitable way in a row with other labels on the carrier material. This carrier material is made so that a completely automatic dispensing of the label before application to the object is possible without great expense. For this purpose, the carrier material can have, as an underlayer, a sulfate paper to which a silicone layer adheres by a polyethylene (PE) film.

As explained above, the at least one safety feature that can also be designated as a safety element represents an effective and reliable aid for determining the presence of all layers of the multilayer label. The use of the safety element in the framework of this invention can be done advantageously by imprinting the safety feature. Alternatively there are also the preferred variants of stamping or punching the safety feature.

The properties of this multilayer label essential to the invention depend basically on the question of the material used. But it has proven advantageous in practice if at least one of the layers consists of plastic, and the plastic involved is advantageously at least one of the following materials: acrylate, polyester, polyethylene (PE), polyethylene terephthalate (PET), polypropylene (PP), polyvinyl chloride (PVC).

Usually labels are provided with information by the producer and/or by the user. Consequently at least one imprint or marking is advantageously provided for the multilayer label according to this invention. This imprint or marking can be provided on the top side of the topmost layer; if one or more of the layers used is transparent, there is also the possibility of applying an imprint or marking on or under the intermediate layers.

According to a preferred embodiment of this invention, a stamping and/or at least a punching is provided for the multilayer label and the latter can involve a safety punch by which the label is segmented.

Regardless of this, or in combination with this, the multilayer label, preferably its top layer, can have an adhesive free joining flap on its underside, to enable one or more layers of the label to be pulled off quickly and without problems.

Other configurations, features and advantages of this invention will be described in more detail below using the embodiments illustrated by way of example in FIGS. 1 to 4.

There are shown in:

FIG. 1, a top view of a first embodiment of a multilayer label according to this invention.

FIG. 2A, a cutaway view from the side of a first embodiment from FIG. 1 in a first variant.

FIG. 2B, a cutaway view from the side of the first embodiment from FIG. 1 in a second variant.

FIG. 3, a top view of a second embodiment of a multilayer label according to this invention, and FIG. 4, a cutaway view from the side of the second embodiment from FIG. 3.

Identical reference symbols in FIGS. 1 to 4 designate the same or similar parts or features.

FIG. 1 shows a top view of a first embodiment of a multilayer label according to this invention.

Figure 1:
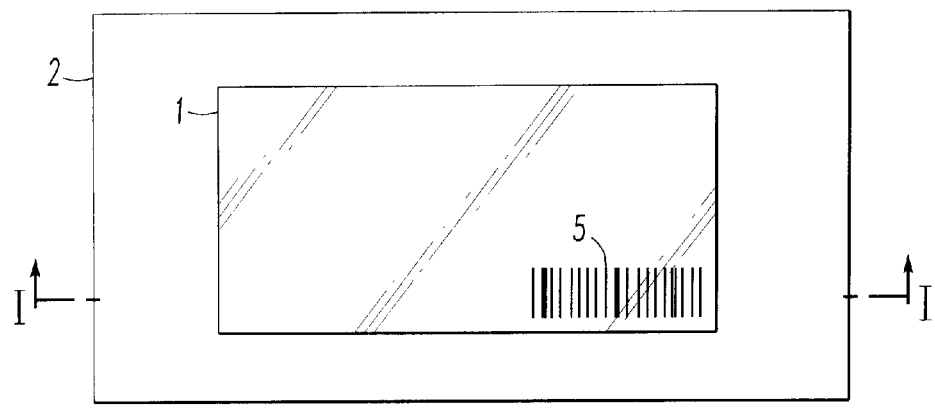

The multilayer label represented in FIG. 1 has a bottom layer 2 and a top layer 1 placed over bottom layer 2, and top layer 1 has a smaller surface area than bottom layer 2 and is transparent. Both layers 1, 2 of the label have a safety feature 5 in the form of a bar code.

Figure 2A:
Figure 2B:
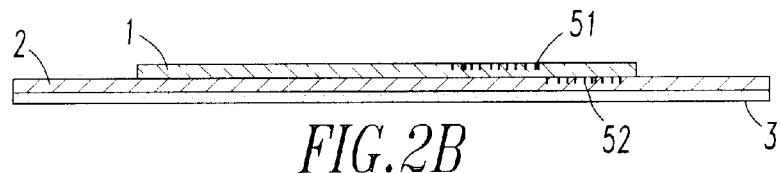

As comes out of FIGS. 2A and 2B, which show in each case a cutaway view from the side of the first embodiment from FIG. 1 in a first variant (see FIG. 2A) and in a second variant (see FIG. 2B), the distribution of the safety feature to both layers 1, 2 of the label is of decisive importance for this invention.

Thus the lines of the bar code according to the embodiment from FIG. 2A are distributed to both layers 1, 2 of the label so that the lines are provided alternately on top layer 1 (upper part 51 of safety feature 5) and on bottom layer 2 (lower part 52 of safety feature 5). Entire safety feature 5 comes together, as can be drawn from FIG. 1, only in a top view of the multilayer label, and for this purpose the transparency of top layer 1 is a requirement. This way an absence of top layer 1 or of bottom layer 2 is immediately noticeable when the bar code is scanned, for example with a laser beam or in the course of another optical procedure.

The alternating arrangement of the lines of the bar code on top layer 1 (upper part 51 of safety feature 5) and on bottom layer 2 (lower part 52 of safety feature 5) makes it possible immediately to determine if both layers 1, 2 of the label are arranged properly relative to one another. In this case, the width and the spacing of the individual lines of the bar code relative to one another would no longer be recognizable in the way intended by the optical scanning procedure.

To be able to apply the multilayer label according to FIG. 2A to any object, bottom layer 2 is provided on its underside with an adhesive layer 3. This involves a conventional contact adhesive.

In the cutaway view from the side of FIG. 2B, the first embodiment from FIG. 1 can be seen in a second variant according to this invention. This second variant differs from the first variant according to FIG. 2A essentially by the distribution of safety feature 5 on both layers 1, 2.

While in FIG. 2A the individual lines of the bar code are provided alternately on top layer 1 and on bottom layer 2 of the label, the variant in FIG. 2B hag left part 51 of the bar code in the drawing on top layer 1 while right part 52 of the bar code in the drawing is on bottom layer 2. An entire safety feature 5 also results in this case, as can be seen in the top view in FIG. 1, if top layer 1 and bottom layer 2 of the multilayer label are arranged relative to one another in the way intended.

To avoid superfluous repetitions, the explanations for variants from FIG. 2A will be used to refer to the other features of the variants from FIG. 2B.

Figure 3:
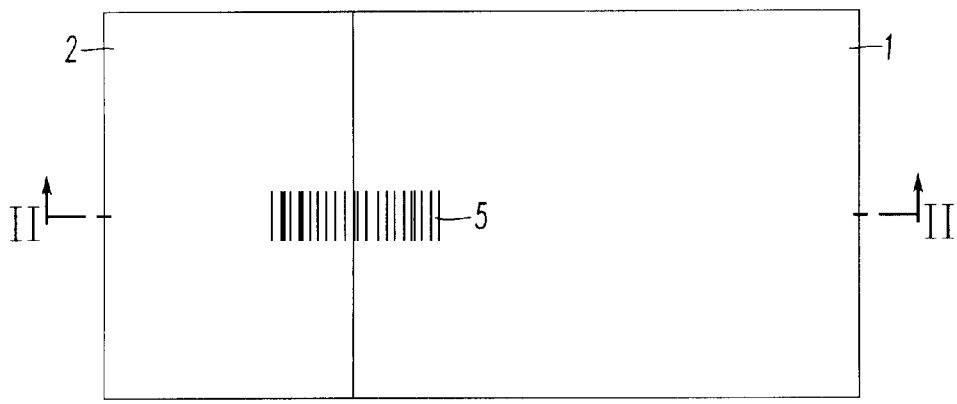

FIG. 3 shows a top view of a second embodiment of a multilayer label according to this invention.

This second embodiment also has a top layer 1 and a bottom layer 2, and each of these two layers 1, 2 has allocated to it, in each case, a part 51, 52 of safety feature 5 in the form of a bar code. Since the surface area of bottom layer 2 of the label is larger than the surface area of top layer 1 of the label, the assembling of safety feature 5 in the second embodiment is performed so that right part 51 of the bar code in the drawing and left part 52 of the bar code in the drawing strike one another at the point at which the left edge of top layer 1 in the drawing ends (see also the cutaway view from the side of the second embodiment in FIG. 4).

In contrast to the first embodiment presented in FIGS. 1, 2A, and 2B, it is not necessary that top layer 1 be transparent. With this in mind, it does not matter if the adhesive, which is placed in sections between top layer 1 and bottom layer 2, is transparent or colored, since in this second embodiment the assembling of safety feature 5 results not from looking through the multilayer label but from an overview of it.

Figure 4:
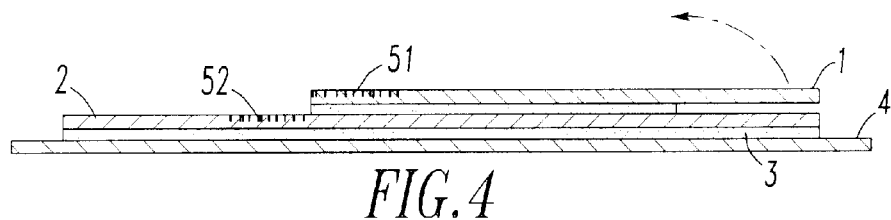

As already explained above, the lower side of top layer 1 of the label has no adhesive in its right part in FIG. 4. This defines a joining flap because it makes it possible to lift or pull top layer 1 off of bottom layer 2 without problems, as indicated by the bent arrow. This promotes the flexibility and multifaceted usability of the multilayer label according to the second embodiment in a positive way.

Further, it can be seen from FIG. 4 that, on the underside of bottom layer 2, there is an adhesive layer 3 by which it is possible to apply the multilayer label according to this invention to an object. This adhesive layer 3 is covered with an anti-adhesive carrier material 4 on the underside of the multilayer label, and the individual labels are arranged in a row on this carrier material 4 and can be applied to the respective object completely automatically when dispensed by a machine.

Figure 5:
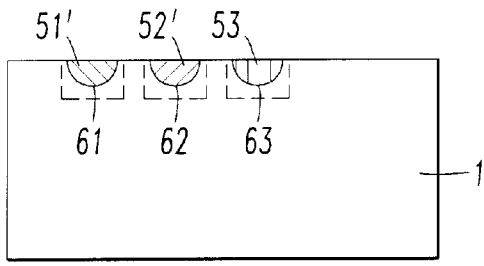
FIG. 5 is a top view of a multilayer label in accordance with an alternative embodiment of the present invention.

FIG. 5 shows another embodiment of the invention. The label has a top layer 1 that is opaque and has three recesses 61, 62, and 63. The recesses are made in the example by semicircular punchings on the edge of top layer 1.

Figure 6:
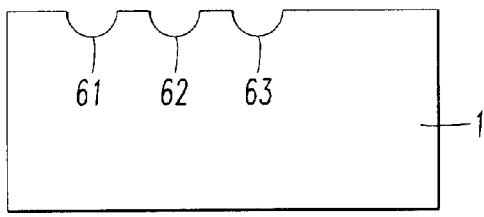
FIG. 6 is a top view of a top layer of the label shown in FIG. 5.
Figure 7:
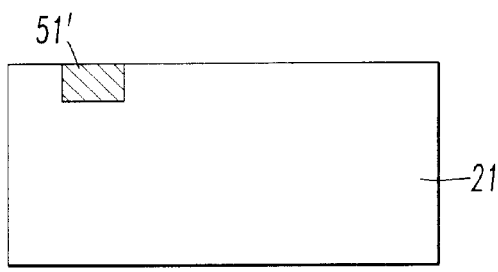
FIG. 7 is a top view of a second layer of the label shown in FIG. 5.

The label shown in FIG. 5 consists overall of four layers, which are shown individually in FIGS. 6 to 7.

FIG. 6 shows top layer 1 with recesses 61, 62 and 63.

FIG. 7 shows layer 21 placed under the topmost layer, and layer 21 is transparent and has marking 51 which can be made, for example, by a colored surface. In the figure, the color is symbolized by a cross-hatching. The position of marking 51 is selected so that, when the label is assembled, marking 51 lies under recess 61 in top layer 1. But the surface area of marking 51 is larger than the surface area of recess 61, so that recess 61 acts as a mask through which a part of marking 51 is visible.

Figure 8:
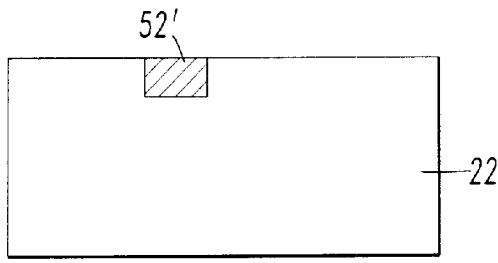
FIG. 8 is a top view of a third layer of the label shown in FIG. 5.
Figure 9:
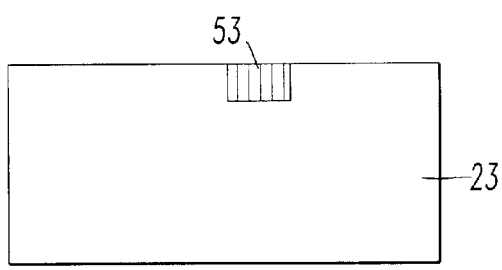
FIG. 9 is a top view of a fourth layer of the label shown in FIG. 5.

Other layers 22 and 23 shown in FIG. 8 are made like layer 21 in FIG. 7, with the measure that marking 52 of layer 22 lies under recess 62 and marking 53 of layer 23 lies under recess 63.

In the assembled label shown in FIG. 5, markings 51, 52 and 53 are visible in recesses 61, 62, and 63, since at least layers 22 and 23 (FIGS. 7 and 8) are transparent.

In the final check of the label, the imprinting on the top layer is examined by an automatic camera. In doing so it simultaneously checks if lower layers 51, 52, and 53 are present, which can be seen in the camera picture shown in FIG. 5. If one of the lower layers were missing, corresponding marking 51, 52 or 53 would be missing in one of recesses 61 to 63, which would be immediately detected by the automatic camera and could be used to generate an alarm.

In mass production of such multilayer labels, it cannot be completely avoided that the individual layers are slightly shifted relative to one another and relative to their desired position. If the deviation from the desired position remains within the preset tolerance, the picture shown in FIG. 5 results unchanged, so that the automatic camera finds the label good and triggers no alarm. But if the deviation is so great that a marking, for example, marking 51, no longer completely fills out its associated recess, recess 61 in the example, this is recognized by the automatic camera and then an alarm can be triggered.

Figure 10:
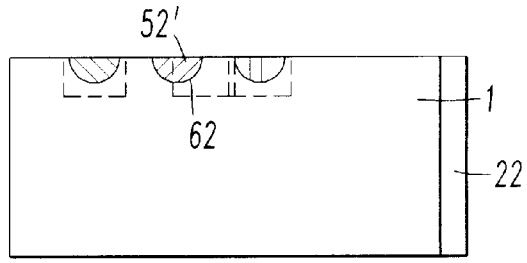
FIG. 10 is a top view of a label wherein the layers have been shifted with respect to one another beyond a tolerance threshold.

FIG. 10 shows a label in which layer 22 is shifted to the right beyond the tolerance threshold, which can be seen by the fact that recess 62 in top layer 1 is not completely filled up by marking 52.

What is claimed is:

1. A multilayer label comprising:
   a first layer defining a bottom layer;
   at least one opaque layer defining a top layer, said at least one opaque layer having at least one recess;
   at least one marking provided on at least one of said first layer and said opaque layer,
      wherein said at least one marking is arranged so as to be positioned below said at least one recess and visible therethrough when said first layer and said at least one opaque layer are properly aligned with respect to each other.

2. The multilayer label of claim 1, wherein said first layer has a marking located below the at least one recess, the marking having a surface area larger than a surface area of the at least one recess.

3. The multilayer label of claim 1, wherein said first layer is transparent.

4. The multilayer label of claim 1, wherein said at least one opaque layer is provided with an adhesive layer on a portion of its underside such that a joining flap of an adhesive-free portion of said at least one opaque layer forms a flap for grasping to remove said at least one opaque layer from said first layer.

* * * * *